US010861116B1

(12) United States Patent
Onstad et al.

(10) Patent No.: US 10,861,116 B1
(45) Date of Patent: Dec. 8, 2020

(54) SYSTEM AND METHODS TO FACILITATE STUDENT DATA PRIVACY COMPLIANCE AND MANAGEMENT FOR SCHOOLS

(71) Applicants: James Onstad, Bend, OR (US); Katie Sue Onstad, Bend, OR (US)

(72) Inventors: James Onstad, Bend, OR (US); Katie Sue Onstad, Bend, OR (US)

(*) Notice: Subject to any disclaimer, the term of this patent is extended or adjusted under 35 U.S.C. 154(b) by 1319 days.

(21) Appl. No.: 14/645,953

(22) Filed: Mar. 12, 2015

Related U.S. Application Data

(60) Provisional application No. 61/952,507, filed on Mar. 13, 2014.

(51) Int. Cl.
G06Q 50/20 (2012.01)
G06Q 30/00 (2012.01)

(52) U.S. Cl.
CPC ......... G06Q 50/205 (2013.01); G06Q 30/018 (2013.01)

(58) Field of Classification Search
None
See application file for complete search history.

(56) References Cited

U.S. PATENT DOCUMENTS 6,270,351 B1 * 8/2001 Roper ............... G09B 7/02 434/118
7,069,427 B2 * 6/2006 Adler ............... G06F 21/6245 713/1
2002/0115447 A1 * 8/2002 Martin ............... G06Q 20/202 455/456.3
2003/0069741 A1 * 4/2003 Hoyer ............... G06Q 30/018 705/317
2005/0008001 A1 * 1/2005 Williams ........... H04L 41/0853 370/352
2008/0235733 A1 * 9/2008 Heie ............... H04N 7/163 725/46
2008/0319295 A1 * 12/2008 Bernstein ........... A61B 5/14865 600/365

(Continued)

OTHER PUBLICATIONS

The Federal Trade Commission, "Protecting Children's Privacy Under COPPA: A Survey on Compliance" https://www.ftc.gov/sites/default/files/documents/reports/protecting-childrens-privacy-under-coppa-survey-compliance/coppasurvey.pdf (Apr. 2002) (Year: 2002).*

(Continued)

Primary Examiner — Paul R Fisher
(74) Attorney, Agent, or Firm — Plager Schack LLP; Mark H. Plager; Stephen Hallberg

(57) ABSTRACT

Some embodiments include systems and methods that facilitate COPPA compliance, and associated FERPA compliance, for schools. The systems and methods allow schools to quickly implement, deploy, and integrate a COPPA compliance platform that facilitates administrative operations over the Internet, thereby enabling schools to be compliant with the latest COPPA and associated FERPA rules. Some embodiments of the COPPA compliance platform use a child's grade level and/or birth certificate information from the Student Information System (SIS) for age verification and make direct personal contact with parents/guardians to verify the parents'/guardians' identity via government issued ID, thereby minimizing the probability of age and identity falsification.

6 Claims, 6 Drawing Sheets

(56) References Cited

U.S. PATENT DOCUMENTS

| | | | | |
|---|---|---|---|---|
| 2011/0185400 A1* | 7/2011 | Webber | ................ | H04L 63/102 |
| | | | | 726/4 |
| 2011/0223890 A1* | 9/2011 | Patterson | ............... | G06Q 10/10 |
| | | | | 455/414.1 |
| 2012/0023263 A1* | 1/2012 | Dozier | .................... | G09B 7/08 |
| | | | | 709/248 |
| 2015/0081810 A1* | 3/2015 | Christianto | ............. | H04L 67/02 |
| | | | | 709/206 |

OTHER PUBLICATIONS

Federal Trade Commission, "Complying with COPPA: Frequently Asked Questions", https://www.ftc.gov/tips-advice/business-center/guidance/complying-coppa-frequently-asked-questions-0#A.%20General%20Questions Captured Sep. 13, 2020. (Year: 2020).*

* cited by examiner

US 10,861,116 B1

SYSTEM AND METHODS TO FACILITATE STUDENT DATA PRIVACY COMPLIANCE AND MANAGEMENT FOR SCHOOLS

CLAIM OF BENEFIT TO PRIOR APPLICATION

This application claims benefit to U.S. Provisional Patent Application 61/952,507, entitled "METHOD AND SYSTEM THAT FACILITATES COPPA COMPLIANCE AND ASSOCIATED FERPA COMPLIANCE FOR SCHOOLS," filed Mar. 13, 2014. The U.S. Provisional Patent Application 61/952,507 is incorporated herein by reference.

BACKGROUND

Embodiments of the invention described in this specification relate generally to data privacy compliance, and more particularly, to student data privacy compliance according to the rules of the Child Online Privacy Protection Act (COPPA) and the Family Education Rights and Privacy Act (FERPA).

Many schools do not have the administrative and/or operational processes in place to be compliant with the latest state and federal student data privacy laws including COPPA and associated FERPA rules. If they do have processes in place, they are paper based and require a large amount of administrative overhead. Online operators bear no responsibility for some aspects of COPPA compliance when their applications, online services, and/or websites are used in a school context, and the collected data is used only for school purposes. Online operators now depend on districts, schools, and teachers to be solely responsible for obtaining verifiable parental consent, in compliance with COPPA rules, when using applications, online services, and/or websites that collect personal information from students under the age of thirteen.

COPPA compliance administration systems available today are meant for websites that are used outside of a school context. These systems are designed to obtain consent directly from parents/guardians. They are not designed for schools to act as intermediaries for parental/guardian consent, or for schools to act as agents for parents/guardians in the collection of personal information from students in a school context.

Therefore, what is needed is a student data privacy compliance and management system that facilitates COPPA and associated FERPA compliance by schools and minimizes the probability of age and identity falsification by verification of a student's age based on the student's grade level and/or birth certificate information, and by verification of identity of the student's parents/guardians by government issued ID provided through direct personal contact.

BRIEF DESCRIPTION

Some embodiments of the invention include a novel student data privacy compliance and management system and methods that facilitate student data privacy compliance and management by schools. In some embodiments, the student data privacy compliance and management system facilitates student data privacy compliance based on COPPA and associated FERPA compliance standards. The student data privacy compliance and management system allows schools to quickly implement, deploy, and integrate a COPPA compliance platform that facilitates administrative operations over the Internet, enabling schools to be compliant with the latest COPPA and associated FERPA rules.

In some embodiments, the student data privacy compliance and management system performs one or more methods for complying with student data privacy standards. In some embodiments, the student data privacy compliance and management system performs a method for complying with student data privacy standards. In some embodiments, the student data privacy compliance and management system performs a method for calculating an operator privacy quality score that facilitates student data privacy compliance and management by schools. In some embodiments, the student data privacy compliance and management system performs a method for using a grade level of a student and a set of birth certificate information associated with the student to verify an age of the student. In some embodiments, the grade level of the student and the set of birth certificate information associated with the student is retrieved from a student information system (SIS) within the student data privacy compliance and management system. In some embodiments, the student data privacy compliance and management system performs a method for making direct personal contact with one of a parent and a legal guardian of a student and verifying identity of the parent or legal guardian of the student by way of a government issued identification, thereby minimizing the probability of age and identity falsification.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

Figure 1:
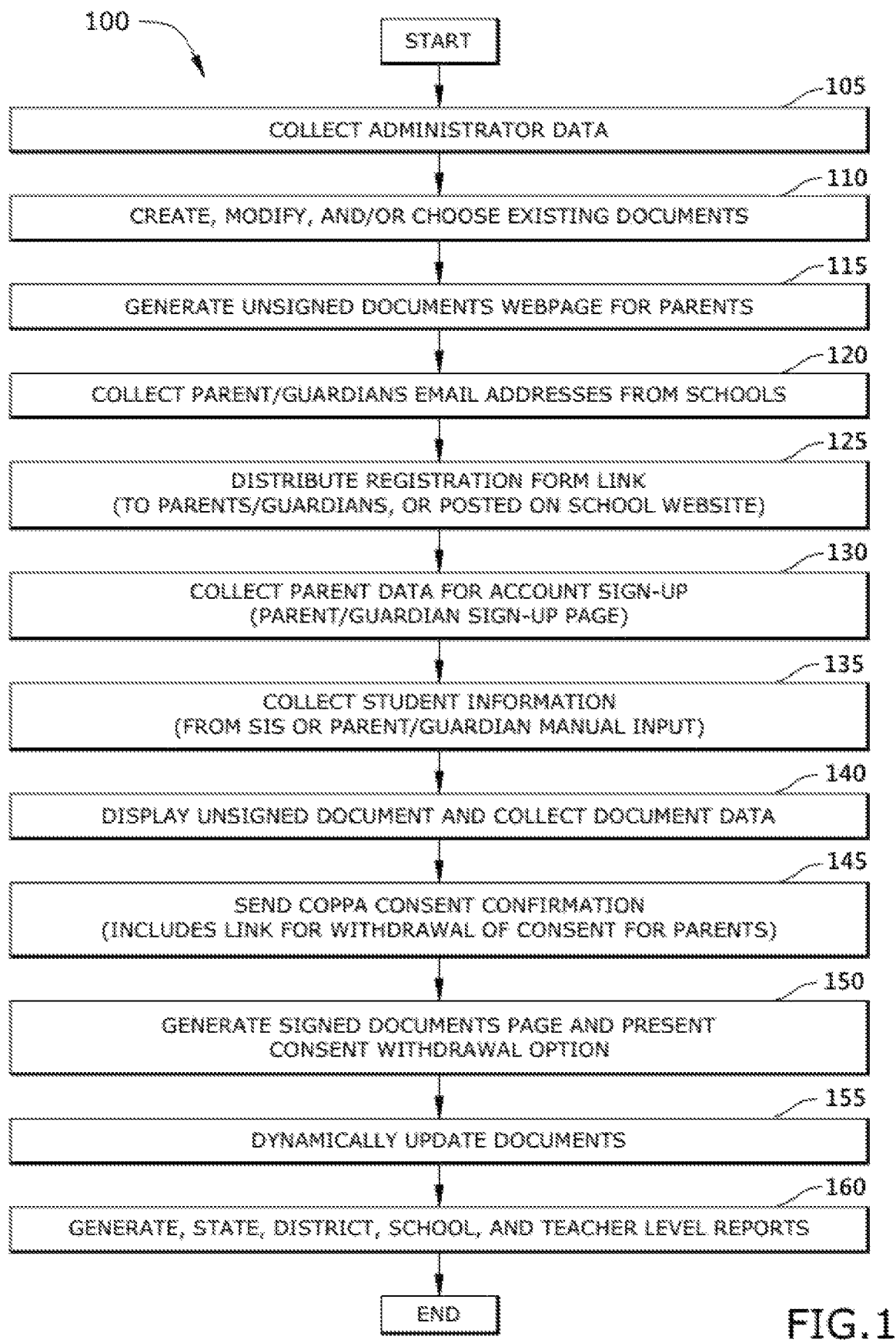
FIG. 1 conceptually illustrates a process that facilitates student data privacy compliance and management by schools in some embodiments.

In the following detailed description of the invention, numerous details, examples, and embodiments of the invention are described. However, it will be clear and apparent to one skilled in the art that the invention is not limited to the embodiments set forth and that the invention can be adapted for any of several applications.

Some embodiments of the invention include a novel student data privacy compliance and management system and methods that facilitate student data privacy compliance and management by schools. In some embodiments, the student data privacy compliance and management system facilitates student data privacy compliance based on COPPA and associated FERPA compliance standards. The student data privacy compliance and management system allows schools to quickly implement, deploy, and integrate a COPPA compliance platform that facilitates administrative operations over the Internet, enabling schools to be compliant with the latest COPPA and associated FERPA rules.

In some embodiments, the student data privacy compliance and management system performs one or more methods for complying with student data privacy standards. In some embodiments, the student data privacy compliance and management system performs a method for complying with student data privacy standards. In some embodiments, the student data privacy compliance and management system performs a method for calculating an operator privacy quality score that facilitates student data privacy compliance and management by schools. In some embodiments, the student data privacy compliance and management system performs a method for using a grade level of a student and a set of birth certificate information associated with the student to verify an age of the student. In some embodiments, the grade level of the student and the set of birth certificate information associated with the student is retrieved from a student information system (SIS) within the student data privacy compliance and management system. In some embodiments, the student data privacy compliance and management system performs a method for making direct personal contact with one of a parent and a legal guardian of a student and verifying identity of the parent or legal guardian of the student by way of a government issued identification, thereby minimizing the probability of age and identity falsification.

In this specification, there are several descriptions of methods and processes that are performed by the student data privacy compliance and management system. However, it should be noted that for the purposes of the embodiments described in this specification, the word "method" is used interchangeably with the word "process". Methods performed by the student data privacy compliance and management system are described, therefore, by reference to several example processes that conceptually illustrate process steps for complying with student data privacy standards, including COPPA and associated FERPA student data privacy standards.

By way of example, FIG. 1 conceptually illustrates a process 100 that facilitates student data privacy compliance and management by schools. As shown in this figure, the process 100 starts by collecting (at 105) administrator data. In whole or in part, the process 100 of some embodiments may collect the administrator data in a manner that allows for creation, modification, and/or selection (at 110) of existing documents. For example, there may be some administrator data already stored in a document of the system and it presently only needs to be updated, or new data may be created to complete the collection of administrator data, etc.

Next, the process 100 generates (at 115) an unsigned documents web page for parents/guardians. If needed, the process 100 of some embodiments may also collect (at 120) parent/guardian email addresses from schools. In some embodiments, the process 100 distributes (at 125) a registration form link to the parents/guardians via email. Alternatively, or in conjunction with distributing the registration form link to parents/guardians, the process 100 of some embodiments posts (at 125) the registration form link on the school's website.

The process 100 next collects (at 130) parent/guardian data for parent/guardian account sign-up (i.e., registration on a parent/guardian sign-up page). Then the process 100 collects (at 135) student information. The process 100 may collect student information from the Student Information System (SIS) and/or from parents/guardians entering the student information in the registration form of the school's website. After the parent/guardian and student information is collected, the process 100 displays (at 140) the unsigned document and collects document data.

In some embodiments, the process 100 then sends (at 145) a COPPA consent confirmation to parents/guardians. For example, the COPPA consent confirmation may be sent to parents/guardians via email transmission. In some embodiments, the COPPA consent confirmation includes a link for withdrawal of consent for parents/guardians. Next, the process 100 generates (at 150) a signed documents page with a consent withdrawal option included. The process 100 then dynamically updates (155) the documents as needed (e.g., new or changed information, consent confirmed or withdrawn, etc.). Finally, the process 100 generates (at 160) a set of student data privacy compliance reports including state, district, school, and teacher level reports. Then the process 100 ends.

One of ordinary skill will realize that the student data privacy standards compliance process 100 described by reference to FIG. 1 is only one example of how some embodiments facilitate student data privacy compliance and management by schools in general, and specifically, facilitate compliance with COPPA and associated FERPA standards by schools. For instance, while the process 100 described by reference to FIG. 1 indicates that email addresses are collected from schools and used to distribute registration forms, other processes that facilitate compliance with COPPA and associated FERPA standards of other embodiments may use other contact information, such as a mobile phone number for distribution of registration form links via text message, or other such electronic forms of communication.

Several more detailed embodiments are described in the sections below. Section I provides a conceptual description of the difficulty existing systems have in satisfying COPPA and associated FERPA compliance standards and how the student data privacy compliance and management system overcomes the problems of the existing systems to allow schools to comply with COPPA and associated FERPA standards. Next, Section II conceptually describes examples of student data privacy compliance and management processes that facilitate COPPA and associated FERPA standards compliance by schools. Section III provides a conceptual description of an architecture of a student data privacy compliance and management system that performs one or more of the processes for complying with COPPA and associated FERPA standards. Section IV describes an electronic system that implements the COPPA and associated FERPA compliance processes.

I. Complying with COPPA and Associated FERPA Standards

As stated above, many schools do not have the administrative and/or operational processes in place to be compliant with the latest COPPA rules and associated FERPA rules. Whatever processes are in place are typically paper-based and require a large amount of administrative overhead to implement, execute, and routinely comply with. Online operators bear no responsibility for COPPA compliance when their applications, online services, and/or websites are used in a school context, and the collected data is used only for school purposes. Online operators now depend on districts, schools, and teachers to be solely responsible for complying with COPPA rules when using applications, online services, and/or websites that collect personal information from students under the age of thirteen.

Current solutions are easily circumvented. Children can easily falsify their age to gain access to website content without parental consent. In addition, these systems do not facilitate COPPA compliance, or associated FERPA compliance, in a school context. Additionally, there are no online COPPA compliance management systems for schools available on the market today. Manual methods used to obtain COPPA compliance are slow, cumbersome and inefficient. Manual methods require a lot of paper, manual collection of data, manual analysis of data, manual preparation of information, manual distribution of information, manual maintenance and unnecessary capital and operational expenditures.

Embodiments of the student data privacy compliance and management system and the methods that facilitate COPPA and associated FERPA compliance by schools described in this specification solve such problems by providing administrative and operational process software applications over the Internet (i.e., the "cloud") that allow schools to be compliant with the latest COPPA and associated FERPA rules and regulations. In short, the student data privacy compliance and management system allows schools to quickly implement, deploy, and integrate a COPPA compliance platform without large investments in hardware, software, and/or human resources.

The student data privacy compliance and management system described in this specification differs from currently existing systems. In particular, some embodiments of the student data privacy compliance and management system differ by facilitating COPPA compliance for schools, including associated FERPA compliance activities, and helping schools bear sole responsibility for obtaining parental consent in compliance with the COPPA rule. Furthermore, the student data privacy compliance and management system is the only system, to date, that can create and execute an electronic "single parental COPPA consent" form. In addition, the student data privacy compliance and management system minimizes the cost and risk associated with implementing, deploying, and integrating a COPPA compliance platform in a school context.

The student data privacy compliance and management system also improves upon currently existing systems by using a child's grade level and/or birth certificate information from the student information system (SIS) for age verification, and by verifying the child's parents' or guardians' identity via government issued ID as confirmed through direct personal contact, thereby minimizing the probability of age and identity falsification and facilitating COPPA compliance.

Furthermore, the student data privacy compliance and management system includes several user classes that aid in facilitating COPPA and associated FERPA standards compliance by schools. The user classes include, without limitation: Master Administrator, State Administrator, District Administrator, School Administrator, Teacher, Parent/Guardian, and Operator Administrator. Different functions and authorizations are associated with each user class, depending upon the assigned user roles.

II. Student Data Privacy Compliance and Management Processes that Facilitate COPPA and Associated FERPA Standards Compliance As noted above, to facilitate standards compliance by schools, some embodiments of the student data privacy compliance and management system perform one or more processes for complying with COPPA and associated FERPA standards.

In particular, some embodiments of the student data privacy compliance and management system may be comprised of elements that individually and/or collectively perform one or more processes for complying with COPPA and/or associated FERPA rules and regulations. One exemplary process may be comprised of the following operations. This list of possible constituent operations is intended to be exemplary only and it is not intended that this list be used to limit the methods or system of the present application to just these operations. Persons having ordinary skill in the art relevant to the present disclosure may understand there to be equivalent operations that may be substituted within the present disclosure without changing the essential function or performance of the method or system.

1. Collect administrator (user) data (typically would occur first to establish a Master Admin account, and once established, Steps #2-#18 can be completed).

2. Collect/modify operator data (must be completed before Step #3, but Step #2 could be omitted, in which case, Step #3 would also be omitted).

3. Calculate and assign operator quality score (must follow Step #2 and occur before Step #4, but Steps #2-3, together, could occur before Step #1. Step #3 may be omitted).

4. Present operator information for audit and selection (must occur before Steps #5-6, but could occur before Step #1 along with Steps #2-3. Step #4 could be omitted).

5. Create, modify and/or choose existing documents (can occur before Step #4 or after Step #7, but must occur before Step #8).

6. Create unsigned documents web page (can occur after Steps #4-5, and must occur before Step #8. Steps #5-6 may occur after Step #1 if Steps #2-4 are omitted).

7. Collect parent/guardian email addresses (may occur anywhere after Step #1 but must occur before Step #8).

8. Distribute registration form link (after Step #7 and before Steps #9-13).

9. Collect parent/guardian data for account sign-up (after Step #8 and before Steps #10-13).

10. Send email address confirmation link to parent/guardian (after Step #9 and before Step #11).

11. Parent/guardian verifies email address (after Step #10 and before Step #12).

12. Collect student information (after Step #11 and before Step #13. Steps #9-12 could be omitted. For instance, integration into (and licensing by) a 3rd party system may obviate the need for these steps, e.g., parental/guardian accounts may already be established, etc.).

13. Display unsigned documents and collect document data (after Step #12 and before Step #14).

14. Send COPPA consent/denial of consent confirmation (after Step #13, but could also occur after Step #15).

15. Restrict or grant student access to online apps/services/websites (anywhere after Step #13, but Step #15 could be omitted).

16. Prepare signed documents page and present consent/withdrawal option to parent/guardian (anywhere after Step #13).

17. Documents are dynamically updated (after Step #13).

18. Prepare state, district, school, and teacher level reports (Step #18 may occur at any time throughout the process, but reports are most comprehensive after Step #17).

While the various steps of the process performed by the student data privacy compliance and management system may include all of the steps as described above, in some embodiments, the student data privacy compliance and management system performs a process with a subset of the eighteen steps noted above. An example of a student data privacy compliance and management process 100 is described above by reference to FIG. 1. Other such processes, with subsets of steps that include less than the eighteen steps noted above, may also be performed by the student data privacy compliance and management system to facilitate COPPA and associated FERPA standards compliance by schools.

Figure 2:
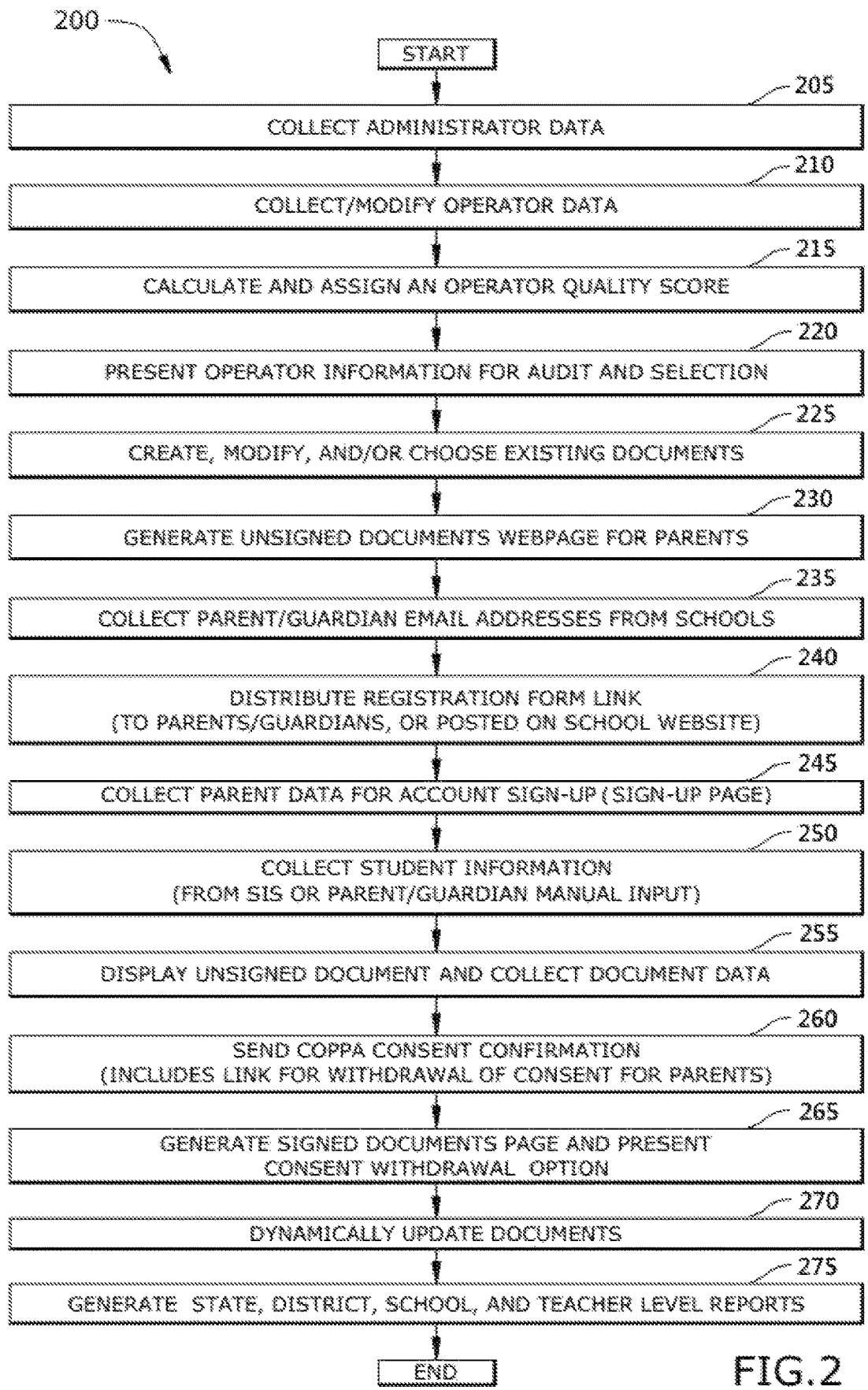
FIG. 2 conceptually illustrates a process that facilitates student data privacy compliance and management by schools and calculates an operator privacy quality score in some embodiments.

By way of example, FIG. 2 conceptually illustrates a process 200 that facilitates student data privacy compliance and management by schools and calculates an operator privacy quality score. The process 200 is similar to the process 100 described above by reference to FIG. 1, except that in this process 200, operator security and data privacy information is collected and used in facilitating the standards-based compliance for schools. The process 200 of some embodiments is implemented and performed by a software application that facilitates COPPA and associated FERPA standards compliance by schools. The software application may perform the process 200, for example, as a cloud-based application service that runs on a web server and which interacts over the Internet with a client computing device of a user of the student data privacy compliance and management system.

As shown in FIG. 2, the process 200 starts by collecting (at 205) administrator data. The process 200 may collect the administrator data from a school website user who in an administrative class of users (e.g., school principal). For instance, the process of collecting the administrator data may be completed manually online by the administrator through a registration web page. By way of example, the collected data may include, without limitation, admin name, title, state, school, district, email address, and password. In collecting the administrator data, the process 200 of some embodiments allows the user to create, modify, and/or select data or documents with some or all of the administrator data to be collected. Additionally, the administrator may be required in some embodiments to agree to the terms and policies related to use of the software. In some embodiments, the collection of administrator data occurs first because an individual admin account needs to be established before the other steps of the process 200 can be performed.

After collecting the administrator data, in some embodiments, the process 200 begins collecting (at 210) operator data. In some embodiments, the collection of operator data includes modification of existing operator data. Collection of the operator data may be completed by manual data entry (i.e., by a teacher, by a school administrator, by a systems administrator, by an operator of the system, etc.). In some embodiments, the manual data entry is completed through an information request form sent from a teacher, an administrator, or a system administrator. In some embodiments, the operator information request may use a subroutine that provides a set of predetermined questions for the online application, service, or website operator. The subroutine may provide a way for operators to respond to the predetermined questions, for example, via web form.

In some embodiments, a notice may be generated if the operator responds to the request. Once the operator data has been collected, the information may then be stored in a database of the student data privacy compliance and management system for future use, thereby eliminating the need for duplicate entry of operator data. Operator data modifications can also be made at this point of the process. Information gathered from the operator may include, without limitation, operator name, operator contact email address and phone number, application/service/website name, types of personal information collected from children, operator information use policy, data deletion policy and procedure, security, confidentiality and integrity policy, data retention and internal deletion policy, etc.

The collection and/or modification of the operator data allows the student data privacy compliance and management system to determine an operator quality score. Thus, the process 200 uses the operator data to calculate and assign (at 215) the operator quality score. In some embodiments, the process 200 calculates and assigns the operator quality score to allow administrators and/or teachers to quickly make informed decisions about which apps/services/websites to use in relation to their schools. The operator quality score may be calculated by analyzing one or more of the operator information use policy, data deletion policy and procedure, security, confidentiality and integrity policy, and data retention and internal deletion policy. The operator quality score can also include information about common core aligned.

In some embodiments, the operator quality score is calculated via a subroutine that analyzes and operator's data policies to calculate a standardized operator quality score. This subroutine includes analysis of data security, data confidentiality, data integrity, data retention, and data deletion metrics of the operator. When calculating the operator quality score, the analysis focuses on rating several aspects of data integrity/security that are vital for schools to be able to comply with COPPA and associated FERPA standards. In particular, the data security measure is analyzed and rated on the basis of the question: "Are security policies and procedures in place that are reasonably designed to protect personal student information against risks such as unauthorized access or use, or unintended or inappropriate destruction, modification, or disclosure?" The data confidentiality measure is analyzed and rated on the basis of electronically encrypted PII data transfer activity. The measure of data integrity is rated according to a data backup plan and data encryption. The data retention measure is rated based on conformity with retaining data for only as long as it serves an educational purpose. The data deletion measure is rated on if a parent can request deletion of their child's personally identifiable data.

In some embodiments, the operator quality score may also include a privacy quality score based on custom student data privacy metrics and/or variables that may be unique to a school or a school district. The custom student data privacy metrics may be based on an analysis of the types of personal information collected from children, the operator information use policy, security, confidentiality and integrity policy, thereby allowing calculation of a standardized operator quality score. Furthermore, a school or a school district can incorporate its own scoring variables into the calculation of the privacy quality score. For example, a school district might weight different elements of the privacy quality score calculation differently in order to focus on elements that are presently more important to the school district.

In some cases, calculation of the privacy quality score may include additional factors for specific online operators. For example, it may be possible to aggregate and monitor safe harbors, pledges, and other commitments that specific online operators have made in relation to the protection of student data privacy. Thus, the privacy quality score provides a privacy rating or privacy ranking system that quantifies a compliance level of the operator based on the several aspects described above, and aides in the calculation of the overall operator quality score.

After operator quality scores are calculated and stored in the student data privacy compliance and management system, audits can be performed and a selection of an operator can be made. In particular, the process 200 presents (at 220) the operator information for audit and selection. For example, the software application may include a graphical user interface (GUI) that displays and/or provides a summary of operator information so that authorized users can understand how an operator will collect, use, and disclose personal information from students. The audit and selection user role may be assigned to any user class, without limitation, including: state admin, district admin, school admin, principal, teacher, or any other authorized user class.

Preferably, the teacher user class will be given authorization from the school admin to audit and select the apps and websites provided by online operators that are used in their classroom. However, other user classes may also be granted this authority. Regardless of which user classes are authorized to audit the operators and select the apps and websites to use in a classroom setting, in some embodiments, the student data privacy compliance and management system includes a dynamic, publicly-accessible web application that displays curriculum information and reports changes in online curriculum (e.g., apps, services, and/or websites) used in each classroom, school, and/or district. For example, the student data privacy compliance and management system may dynamically display, on a school or district website, current apps and websites chosen by teachers.

Next, the process 200 will create, modify and/or choose (at 225) documents, such as parent/student contracts and consent forms. For example, a new consent form may be created or an existing parent/student contract may modified. In some embodiments, the contracts include, but are not limited to: Acceptable Use Policy (AUP), student pledge, and home/school agreements. Consent forms will consist of the school/district's name, and types of personal information that will be collected from students. The consent form may also include information about schools becoming intermediaries between operators and parents/guardians in the notice and consent process, and becoming the parent's/guardian's agent in the process of collecting personal information online from students in the school context. The consent form may include a signature and agreement area for parental/guardian consent, and instructions outlining how to sign and return the form. Disclosure of operator information, in contracts and consent forms, is optional.

In some embodiments, the process 200 next generates (at 230) an unsigned documents web page for parents/guardians. For example, if new contracts or consent forms are created, modified or chosen at 225 of the process 200, the student data privacy compliance and management system may then create a forms link and web page for distribution to the parents/guardians. The process 200 then collects (at 235) parent/guardian email addresses from schools. If a parent/guardian has previously submitted an email address to the school or to the district, then the email address may be collected via standard data retrieval methods (e.g., data integration, data import, manual review and entry, etc.).

With parent/guardian contact details collected, the process 200 next distributes (at 240) a registration form link to the parents/guardians via email. In some embodiments, the registration form link includes a hyperlink to the registration form posted on a sign-up web page of the school's website. In some embodiments, the process 200 collects (at 245) parent/guardian data from the registration form on the sign-up web page for parent/guardian account sign-up.

Next, the process 200 of some embodiments collects (at 250) student information. The process 200 may collect student information from the Student Information System (SIS) and/or from parents/guardians entering the student information in the registration form of the school's website. After the parent/guardian and student information is collected, the process 200 displays (at 255) the unsigned document and collects document data.

The process 200 of some embodiments transmits (at 260) a COPPA consent confirmation to parents/guardians by email. In some embodiments, the COPPA consent confirmation includes a link for withdrawal of consent for parents/guardians. The process 200 then generates (at 265) a signed documents web page with an option to withdraw consent. Next, the process 200 of some embodiments dynamically updates (270) the documents as needed (e.g., new or changed information, consent confirmed or withdrawn, etc.). The process 200 then generates (at 275) the state, district, school, and teacher-level COPPA compliance reports. The process 200 then ends.

As noted above, the student data privacy compliance and management system of some embodiments performs a fully comprehensive process for complying with COPPA and associated FERPA standards. The process is fully comprehensive and inclusive of all eighteen of the steps described above. An example of such a fully comprehensive process is described by reference to FIGS. 3 and 4, which conceptually illustrate a process 300 for facilitating compliance with COPPA and associated FERPA standards by schools. The process 300 may be implemented and performed by a software application that facilitates school compliance with COPPA and associated FERPA standards. The software application may perform the process 300, for example, as a cloud-based application service that runs on a web server and which interacts over the Internet with client computing devices of users of the system.

Figure 3:
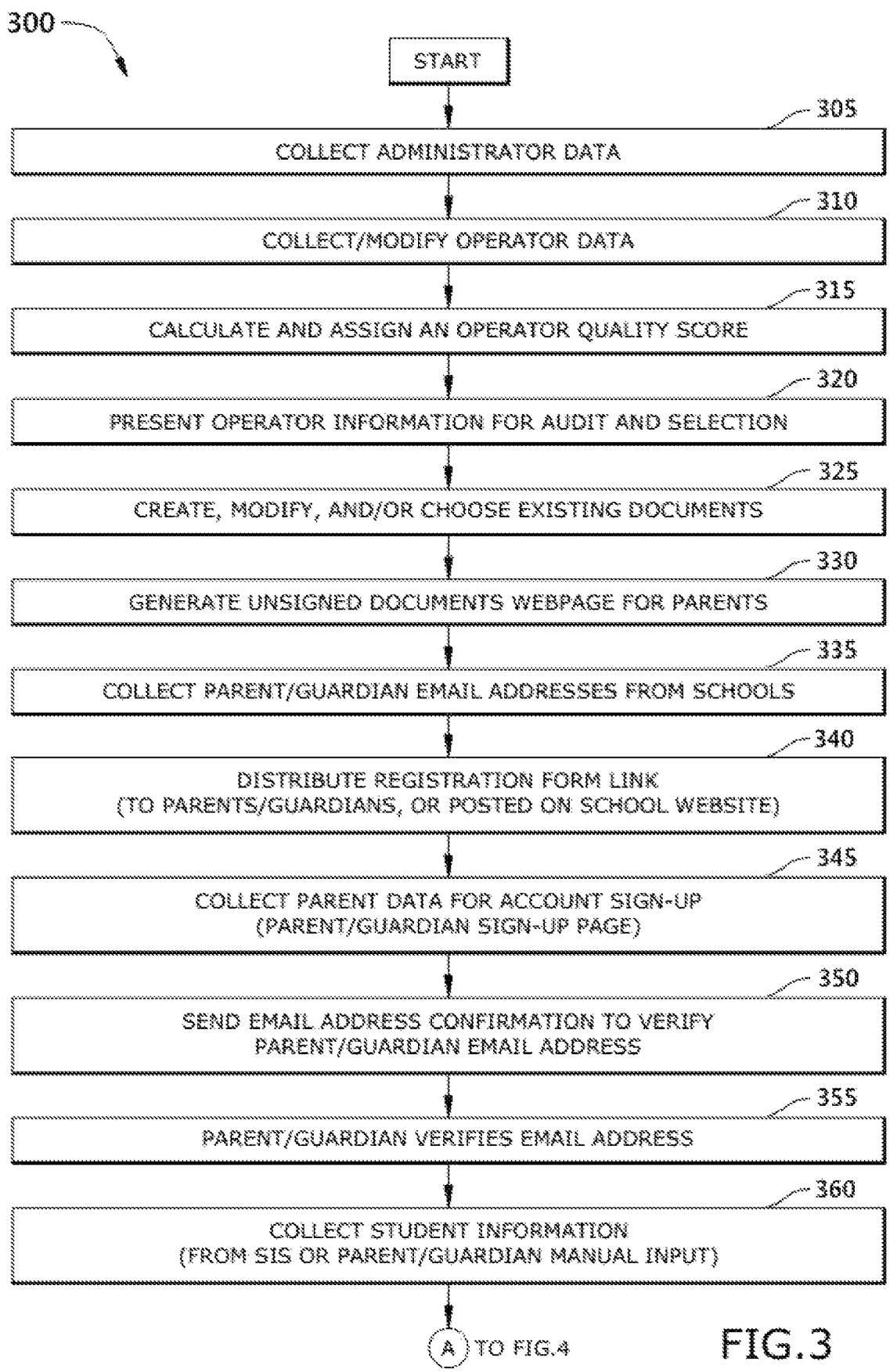
FIG. 3 conceptually illustrates a process for complying with COPPA and associated FERPA standards by schools in some embodiments.

As shown in FIG. 3, the process 300 includes several operations similar to operations described by reference to FIGS. 1 and/or 2. Such operations are similar enough to the corresponding operations described by reference to FIGS. 1 and/or 2 that expanded description of these operations would amount to an exercise in redundancy. Therefore, in the interests of brevity, the steps of process 300 that correspond to detailed descriptions of steps in processes 100 and/or 200 of FIGS. 1 and/or 2 are mentioned succinctly without expanded explanation. A person skilled in the art would appreciate the similarities between some of the steps of the processes, and therefore, should make note of such expanded description as needed.

As in processes 100 and 200 of FIGS. 1 and 2, respectively, the process 300 of FIG. 3 starts by collecting (at 305) administrator data. The process 300 then collects (at 310) new operator data and/or modifications to existing operator data. Next, the process 300 calculates and assigns (at 315) an operator quality score to allow administrators and/or teachers to quickly make informed decisions about which apps/services/websites to use in relation to their schools. The process 300 then presents (at 320) the operator information and calculated quality score for audit and selection (e.g., displaying the information/quality score in a GUI of the web page).

In some embodiments, the process 300 then creates, modifies and/or receives a selection of (at 325) documents. Next, the process 300 generates (at 330) an unsigned documents web page for parents/guardians. In some embodiments, the process 300 will perform the steps at 325 and 330 only after completing the operations at steps 305-320. However, as the operations at step 325 include the creation, modification, and/or choice of existing documents (i.e., contracts, consent forms, etc.), and the operations at step 330 include the creation of an unsigned documents web page, the inclusion of operator information in contracts and consent forms at steps 325 and 330 is optional. If the operator information is not included, for example, then the operations at steps 325 and 330 may occur before the operation at step 320. Nevertheless, the operations at steps 325 and 330 must occur in sequence (in other words, step 330 cannot occur before completion of step 325).

Additionally, creation of consent documents may be aided, in some embodiments, by a component selection process that allows the user to choose from existing verbiage that is used in other consent forms, and/or by selecting standardized templates. For instance, if new parent/student contracts or consent forms are created at step 325, then the process 300 may present templates that help to simplify creation of the consent forms, or if the parent/student contracts or consent forms are modified at step 325, then the process 300 may present existing contracts or consent forms to be chosen for modification. In this way, the user can mix, match, and customize the verbiage to quickly create consent documents.

Referring back to the operations of process 300, in some embodiments, the process 300 collects (at 335) parent/guardian email addresses from schools. Next, the process 300 distributes (at 340) a registration form link (that directs to an account sign-up web page) by email to the parents/guardians. The process 300 then collects (at 345) parent/guardian data from the registration form on the sign-up web page.

In some embodiments, the process 300 sends (at 350) an email address confirmation to verify the parent/guardian email address. For example, if the process 300 successfully collects, at step 345, the parent/guardian data from the registration on the website sign-up page, then the process 300 will attempt to verify the collected email address in any of several ways to confirm a true email, such as by sending a confirmation code to the email address specified by the parent/guardian and collected by the process at step 345.

Next, the process 300 receives (at 355) a verification of the parent/guardian email address. For example, the confirmation code may be viewed by the parent/guardian and then entered into an email address verification web page generated to confirm the accuracy of the email address. Alternative methods of receiving verification include receiving a reply to a confirmation email and other such manners of confirming the parent/guardian email address. Also, in some embodiments, if the parent/guardian receives the confirmation code by email, then the process 300 listens for consent withdrawal, which may be subsequently received at any time after the confirmation code is sent. For example, the software application that implements and performs the process 300 may include an event listener object or sub-routine that triggers transmission of a notification of consent withdrawal.

In some embodiments, the process 300 next collects (at 360) student information (e.g., from the SIS and/or from direct input by parents/guardians). After the parent/guardian and student information is collected, the process 300 displays (at 365) the unsigned document and collects document data. Next, the process 300 sends (at 370) a COPPA consent confirmation to parents/guardians by email, including a link for withdrawal of consent. Withdrawal of consent is possible directly at this step. Furthermore, withdrawal of consent is possible later in some embodiments. For example, the process 300 later generates the signed documents page and presents the withdrawal option (all subsequent to email confirmation).

In some embodiments, the process 300 next includes an operation to restrict or grant (at 375) student access to apps/services/websites. In some embodiments, the process 300 allows a user to skip the operation to restrict or grant student access. In some embodiments, a user can skip this step for one section of restriction/grant, but may proceed with selection of restriction or granting for another section. For example, a principal may restrict access to certain websites, grant access to specific websites designated by a teacher as curriculum-based, and skip a section pertaining to restriction/granting of access to certain apps and/or services that may be generally accessible over the Internet.

Next, the process 300 of some embodiments generates (at 380) a signed documents web page with an option to withdraw consent. As noted above, a parent/guardian may select the option to withdraw consent at this time (subsequent to email confirmation). Next, the process 300 dynamically updates (385) the documents. The process 300 then generates (at 390) the state, district, school, and teacher-level reports based on the school's level of COPPA compliance. The process 300 then ends.

Figure 4:
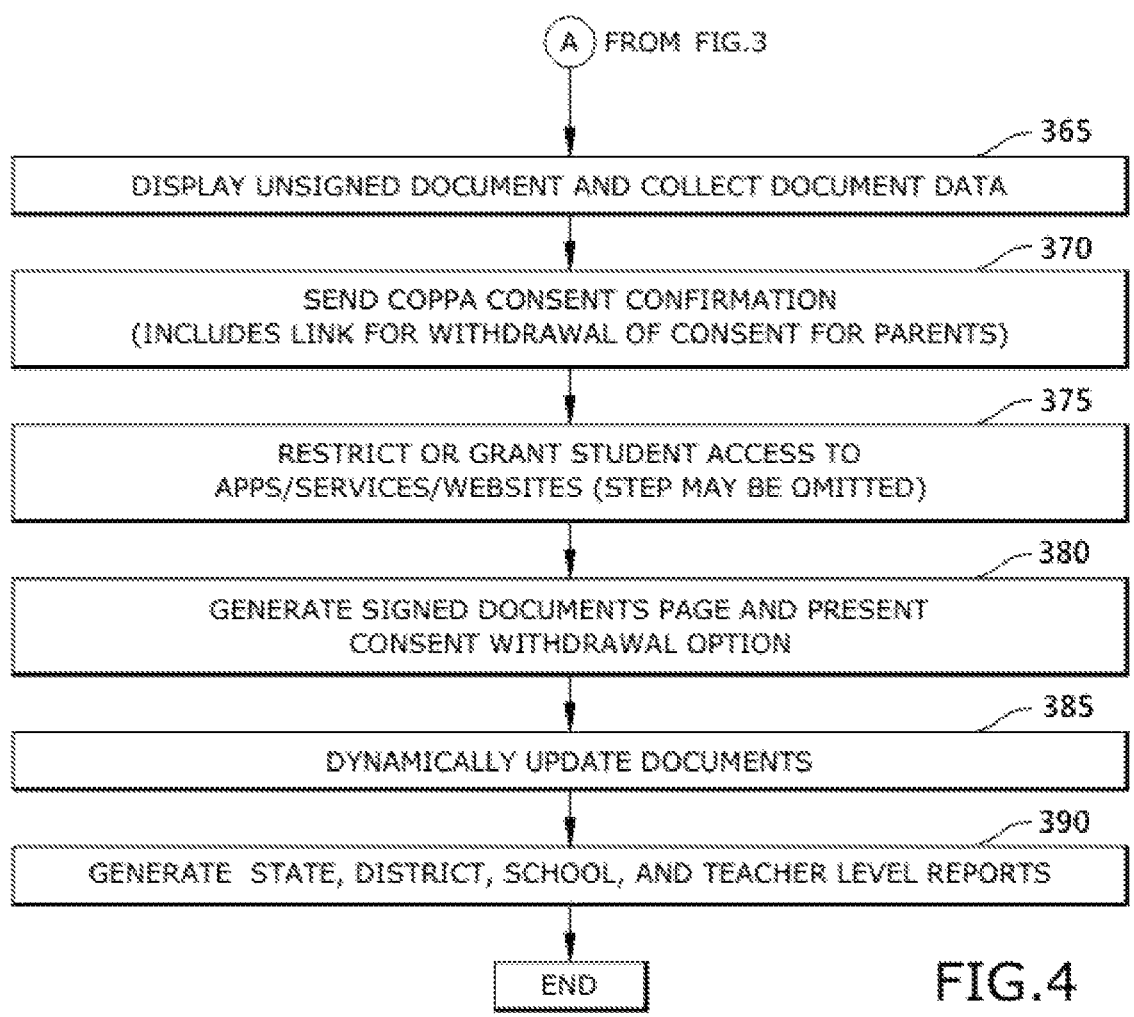
FIG. 4 is a continuation of the process of FIG. 3.

Overall, the operations described above by reference to Steps #1-18 are performed by a process, such as the process 300 described by reference to FIGS. 3 and 4. As shown in these figures, both the required and optional operational steps are included. This fully comprehensive process 300 for facilitating school compliance with COPPA and/or associated FERPA rules and requirements is a preferred process of the system of some embodiments. However, a person skilled in the art would appreciate that the order of some of the steps are not required in the exact same order as the order of the steps shown in FIGS. 3 and 4, and that some operations may occur contemporaneously with other operations, and so forth.

III. Student Data Privacy Compliance and Management System that Facilitates COPPA and Associated FERPA Standards Compliance By way of example, FIG. 5 conceptually illustrates an example of an architecture of a student data privacy compliance and management system 500 that facilitates COPPA and associated FERPA standards compliance by schools. As shown in this figure, the student data privacy compliance and management system 500 facilitates school compliance with COPPA and associated FERPA standards in relation to the actions of students 510, parents/guardians 512, teachers and administrators (i.e., state administrators, district administrators, and/or school administrators) 514, and developers 516. The actions of the students 510, parents/guardians 512, teachers and administrators 514, and developers 516 are performed by operation of computing devices. For instance, a student 510 may use a laptop computer to connect to the student data privacy compliance and management system 500 by a wired or wireless Internet ("cloud") connection 518 or an administrator 514 may use a mobile computing device, such as a smartphone, to make a wireless connection 518 to the student data privacy compliance and management system 500.

The student data privacy compliance and management system 500 includes firewall devices 520 (or computing devices that run firewall software) to prevent unauthorized access to the system 500. Additionally, all network traffic occurring by wired or wireless connection 518 through the Internet is encrypted. For example, data may be transmitted according to secure hypertext transfer protocol (https) with an implementation of secure sockets layer (SSL).

Behind the firewalls 520, the student data privacy compliance and management system 500 includes router devices 522 that route network traffic within a local area network (LAN) or wide area network (WAN) deployed as the internal network of the system 500. At least one router 522 routes data traffic to and from one or more school district student information system (SIS) servers 524, while the router 522 or another router 522 routes data traffic to and from a set of SIS integration servers 526. In some embodiments, one or more of the SIS integration servers 526 is publicly accessible over the Internet (e.g., via a public cloud service) or, alternatively, is privately accessible over the Internet (e.g., via authenticated log-on to a private cloud service or private corporate network).

The router 522 or another router 522 of the system 500 routes data traffic to and from other servers of the student data privacy compliance and management system 500. The other servers of the student data privacy compliance and management system 500 include a set of auto scaling web servers 530, a set of auto scaling geo-replicated database servers 532, a set of auto scaling mass email servers 534, at least one source code control server 536, at least one storage server 538, and at least one scheduled jobs server 540. In some embodiments, the student data privacy compliance and management system 500 includes additional servers beyond the servers described by reference to FIG. 5. Additionally, some embodiments of the student data privacy compliance and management system 500 include one or more load balancing servers. The student data privacy compliance and management system 500 shown in this figure includes three load balancing servers 528 which balance network traffic between connecting computing devices and the set of web servers 530, the set of database servers 532, and the set of mass email servers 534.

Users of the student data privacy compliance and management system 500 employ a client computing device to interactively use the system 500 to perform operations including: log in to the student data privacy compliance and management system 500; collect operator data; perform an audit and selection process for online operator applications/services/websites; prepare, distribute, and maintain documents—monitor parental/guardian consent responses; monitor the distribution of consent confirmation messages, administer and maintain documents—request consent from parents/guardians of new students; create and/or modify a list of online apps/service/websites that will be used in the classroom; notify parents/guardians of changes to the online apps/services/websites that are used in the classroom; access reports for COPPA compliance activities; have the opportunity to grant consent or deny consent; review operator policies and quality scores; review a child's personal information types that are collected by operators; review application/service/website usage changes made in their child's classroom; request the deletion of the child's personal information; submit the types of personal information that is collected from students by operators; submit operator information use and deletion policies; submit operator data security, data confidentiality, and data integrity policies; submit operator data retention and internal data deletion policies; review operator quality score; submit ideas and feedback for the improvement of processes and communication practices used for compliance activities in the school context.

In some embodiments, one or more of the web servers 530 of the student data privacy compliance and management system 500 hosts a dynamic, publicly-accessible website that runs a web application that displays curriculum information and reports changes in online curriculum (e.g., apps, services, and websites) used in each classroom, school, and/or district. For example, the web application may dynamically display, on a publicly-accessible school or district website, current apps, services, and websites chosen by teachers for use in the classrooms.

In some embodiments, the collection of parent/guardian, student, teacher, school, district, and administrator data may be required by system design. Additionally, the design of the student data privacy compliance and management system may further require, in some embodiments, the creation, modification, and/or selection of documents—the creation and posting of documents—the delivery of registration form link and email address confirmation link to parent/guardian, the collection of email address confirmation, the presentation of consent and/or withdrawal operations, the collection and monitoring of consent responses, the delivery of COPPA consent confirmation, the preparation of operator information policies and documents—the preparation of the documents to be signed, the dynamic update of documents, and the preparation of one or more of state, district, school, and teacher reports. Optional operations may include the collection of operator information, the school administrator request for operator information, presenting operator information for audit and selection, the operator quality score evaluation, the granting and restriction of student access to online applications/services/websites on the students' computing device, and/or the automatic updates for parent/student contracts.

Figure 5:
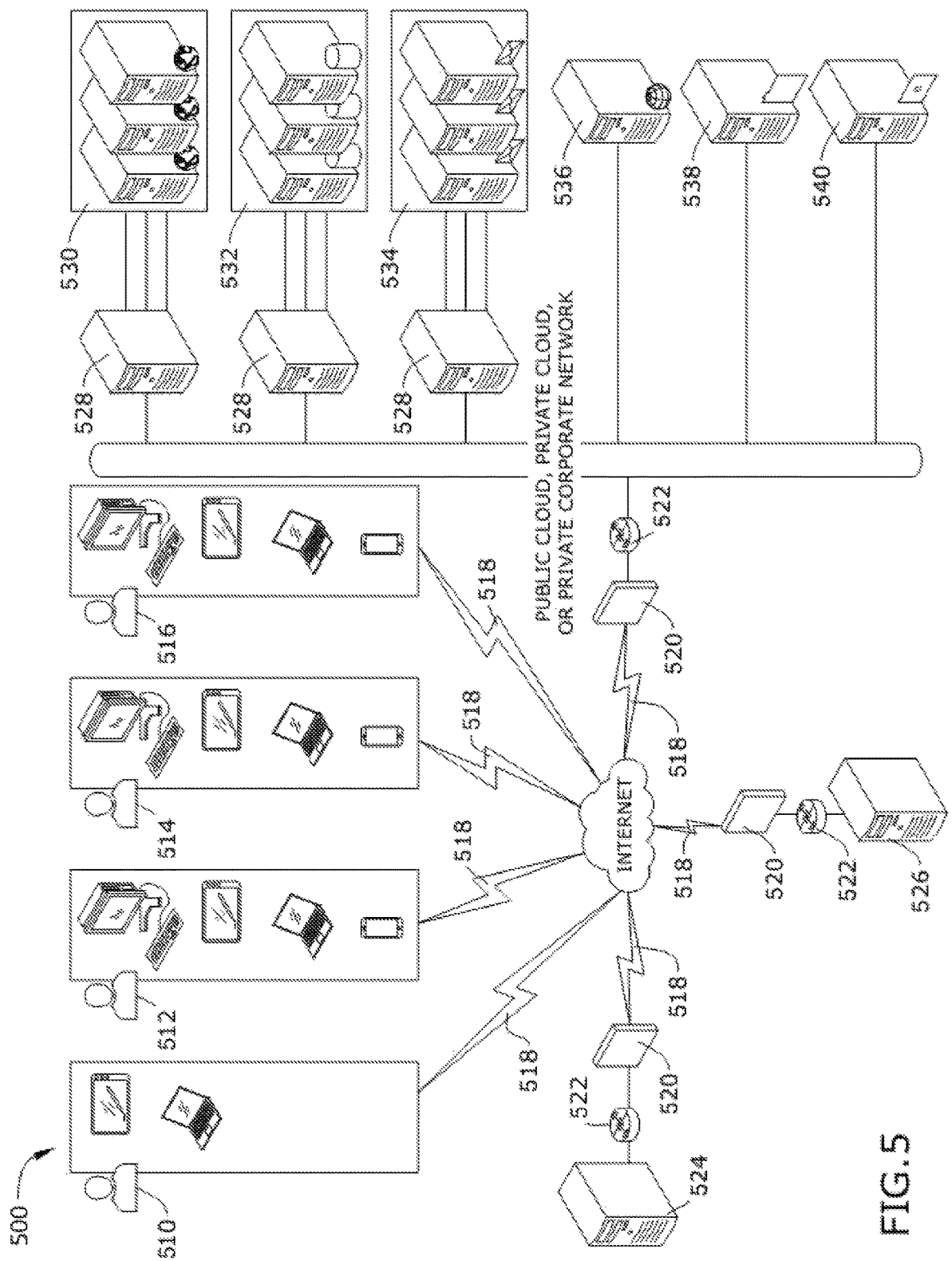
FIG. 5 conceptually illustrates a system that facilitates COPPA and associated FERPA compliance by schools in some embodiments.

To make the student data privacy compliance and management system of the present disclosure, a person may design and/or develop a cloud-based system architecture, such as the architecture of the student data privacy compliance and management system 500 described by reference to FIG. 5, above. In some embodiments, the cloud-based system architecture may be based on a Software as a Service (SaaS) model. In some other embodiments, the person may design and/or develop a stand-alone or client-server model that uses local district or school computing resources, such as existing and/or new computing devices (e.g., server computers, desktop computers, laptop computers, mobile computing devices, etc.), a network (e.g., LAN, WAN, Intranet, etc.), database and data storage computing resources, etc. In some other embodiments, the person may license one or more aspects of the student data privacy compliance and management system or methods described in this specification and incorporate the logical modules and units of those system or method aspects into one or more existing Student Information Systems (SIS), Student Information Management Systems, Learning Information Management Systems, Student Data Chain of Custody System, or similar education management platforms.

In some embodiments, the student data chain of custody system dynamically monitors, records, and expresses the data chain of custody in relation to student data in the student data privacy compliance and management system.

For example, the data chain of custody may include data informative of who presently has student data, how each present possessor of student data uses the data, how long each present possessor of student data will retain possession of the student data. The data chain of custody may also include data informative of each prior possessor of student data, how the prior possessors used the data, and how long the prior possessors were in possession of the student data, etc. In some embodiments, the student data chain of custody system expresses the data chain of custody via offline or online graphics, analytics, text, or any other expression of data possession metrics.

The preferred method of making the student data privacy compliance and management system and processes for facilitating schools in complying with COPPA and associated FERPA standards is with a cloud-based Software as a Service (SaaS) model. The cloud-based SaaS model consists of load balanced cloud-based web servers, load balanced cloud-based database servers, and cloud-based source control servers. The person would need at least one, and preferably more development computers running a local development environment or a cloud-based virtual development environment. Any of the popular software development languages could be used to make this invention. These software development languages include, but are not limited to: JAVA, C#, C/C++, Visual Basic, JavaScript with CSS and HTML, PHP, Perl, Python, or Ruby. There are many other development languages that could be used. Embodiments of the student data privacy compliance and management system and methods of the present disclosure are 100% independent of the development language that is used to create it. Therefore, a person skilled in the art would understand that any development and/or programming language could be used to develop the software applications running in the system and which implement the methods of the system.

By using the SaaS model, the customer only needs to purchase the Software as a Service (SaaS) and does not need to install the software on local computing resources. That is, there is no need for the customer to purchase and provision their own web servers, their own database servers, or any other local infrastructure. Only an Internet connection and a local personal computing device, such as a PC, Mac, tablet, or a smart phone, are required for the customer to access the service. The local computing devices are only required to have an Internet browser, and no other software is needed to connect to and use the student data privacy compliance and management system when based on the SaaS model.

Some embodiments of the student data privacy compliance and management system 500 perform other methods that improve aspects related to student data privacy compliance and management by schools. Some of the other methods include (i) a method for parents/guardians to request the deletion of a child's personal data to all operators, (ii) a method for the operator to accept data deletion requests without the parent/guardian having to send an email, send a letter via the US post office, or make a call on the telephone, (iii) a method for the operator to keep the parent/guardian up-to-date on the status of the parent's/guardian's data deletion request, (iv) a dynamic, online method by which an online operator can verify whether parental consent has been granted to specific children, (v) a set of online curriculum review, audit, and reporting methods which allow districts to review and approve instructional resources that teachers use in the classroom, (vi) a method that allows online operators with age verification services based on school records, and (vii) a method/module that allows schools to use the system for consent for other activities (i.e., sports, band, field trips, clubs, or any other school related events or activities) that require parent/guardian consent and/or permission. Text message communication with parents/guardians could be added so that consent could be granted in short notice situations, or in scenarios where the parent/guardian is unable and/or unwilling to communicate via email.

Some embodiments of the student data privacy compliance and management system can be adapted for use in non-school environments which need to obtain parental/guardian consent for any child-specific privacy concerns, events, and/or initiatives. In addition, embodiments of the student data privacy compliance and management system could be used to obtain consent for sport-related or other activities outside a school environment that require the participant, and/or legal guardian of participant, to sign a consent and/or waiver form. Similarly, some embodiments of the student data privacy compliance and management system could be used for consent activities in training and continuing education environments. Also, the student data privacy compliance and management system could be adapted for use in the healthcare sector to obtain, for example, patient consent for medical activities.

In some embodiments, a data integration subroutine may be employed by the student data privacy compliance and management system to pull student, parent/guardian, teacher, school and district data into the system database. Such a subroutine may be used in connection with processes 100, 200, and 300, which are described by reference to FIGS. 1, 2, and 3-4, respectively. In particular, the data integration subroutine could be used in the software application that implements and performs the process 300, for example, at step 305 (collection of administrator data), at step 335 (collection of parent/guardian email addresses from schools), and at step 360 (collection of student information).

The collection, calculation and assignment of the operator quality score (steps 210 and 215 of process 200 described by reference to FIG. 2, and steps 310 and 315 of process 300 described by reference to FIG. 3) could also be used as an independent program or module that help schools make informed decisions about the online apps/services/websites used at the school.

The operator information collected could be expanded to include student usage and performance information. That information could be posted to the invention database, by operators, through the use of an Application Program Interface (API). The API would also provide the building blocks for applications to offer insight and understanding of student usage and performance information.

The student data privacy compliance and management system 500 of some embodiments may, after a certain amount of regular use, produce a valuable body of education data related to compliance activities and initiatives surrounding COPPA, FERPA, and the Children's Internet Privacy Act (CIPA). For example, by way of an API, the body of education data can be captured and/or retrieved in relation to student usage of online apps, services, websites, etc. This body of education data could be used by third parties for various activities. For example, by accessing the education data through an API, one or more third parties may be able to track and assess education performance statistics which could be used to assess the performance of students/teachers/districts/states, etc. Similarly, the education data may allow a third party to objectively review and understand the types of compliance activities that best support the short and long term goals of parents/guardians, educators, and/or education technology system providers.

Overall, embodiments of the student data privacy compliance and management system and processes described in this specification make COPPA and associated FERPA standards compliance faster, easier, and more efficient by reducing the need for paper processes, streamlining the process of collecting data, analyzing data, preparing and distributing information, simplifying maintenance, and reducing school expenses.

IV. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors, cores of processors, or other processing units), they cause the processing unit(s) to perform the actions indicated in the instructions. Examples of computer readable media include, but are not limited to, CD-ROMs, flash drives, RAM chips, hard drives, EPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 6:
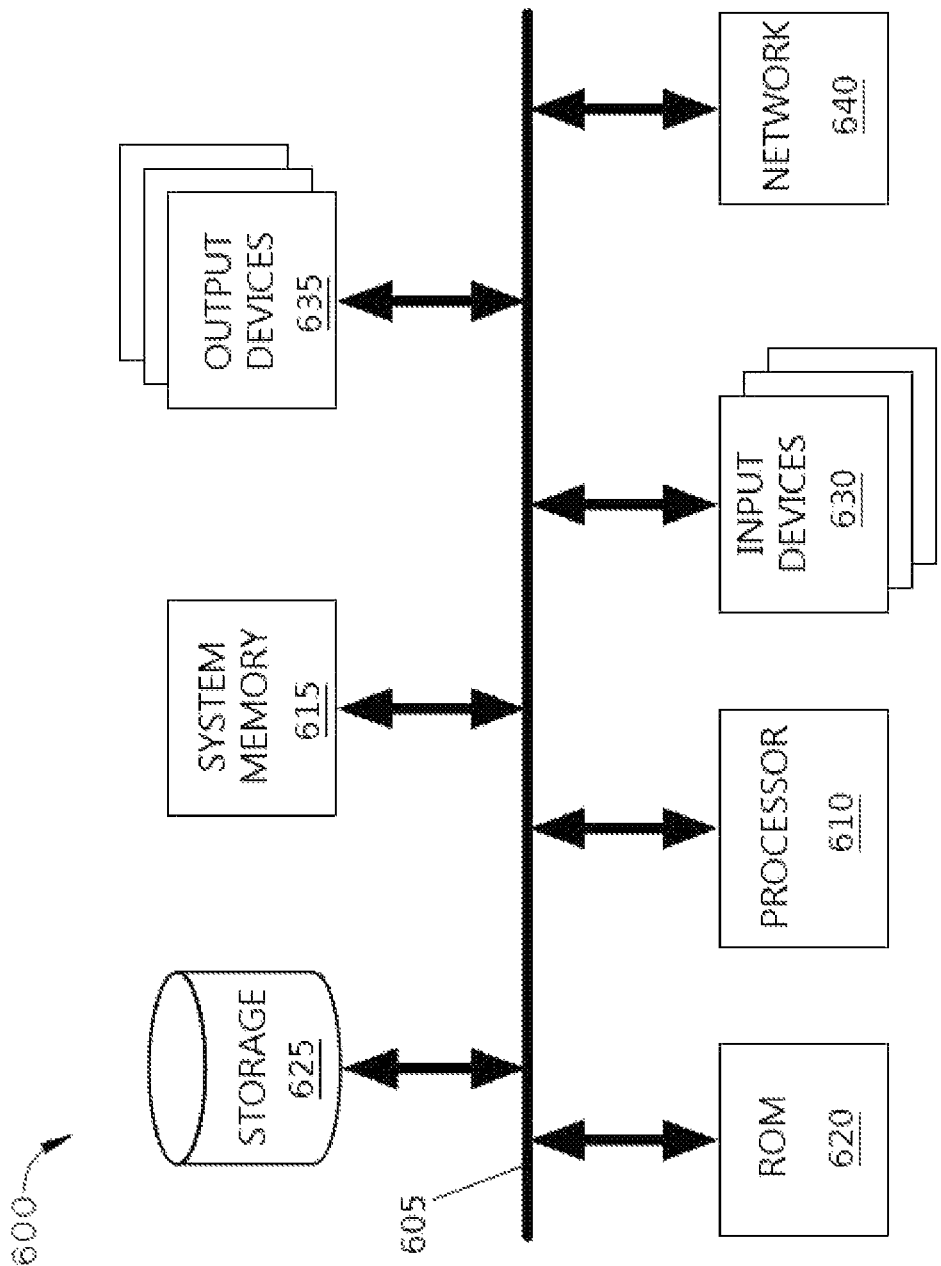
FIG. 6 conceptually illustrates an electronic system with which some embodiments of the invention are implemented.

FIG. 6 conceptually illustrates an electronic system 600 with which some embodiments of the invention are implemented. The electronic system 600 may be a computer, phone, PDA, or any other sort of electronic device. Such an electronic system includes various types of computer readable media and interfaces for various other types of computer readable media. Electronic system 600 includes a bus 605, processing unit(s) 610, a system memory 615, a read-only 620, a permanent storage device 625, input devices 630, output devices 635, and a network 640.

The bus 605 collectively represents all system, peripheral, and chipset buses that communicatively connect the numerous internal devices of the electronic system 600. For instance, the bus 605 communicatively connects the processing unit(s) 610 with the read-only 620, the system memory 615, and the permanent storage device 625.

From these various memory units, the processing unit(s) 610 retrieves instructions to execute and data to process in order to execute the processes of the invention. The processing unit(s) may be a single processor or a multi-core processor in different embodiments.

The read-only-memory (ROM) 620 stores static data and instructions that are needed by the processing unit(s) 610 and other modules of the electronic system. The permanent storage device 625, on the other hand, is a read-and-write memory device. This device is a non-volatile memory unit that stores instructions and data even when the electronic system 600 is off. Some embodiments of the invention use a mass-storage device (such as a magnetic or optical disk and its corresponding disk drive) as the permanent storage device 625.

Other embodiments use a removable storage device (such as a floppy disk or a flash drive) as the permanent storage device 625. Like the permanent storage device 625, the system memory 615 is a read-and-write memory device. However, unlike storage device 625, the system memory 615 is a volatile read-and-write memory, such as a random access memory. The system memory 615 stores some of the instructions and data that the processor needs at runtime. In some embodiments, the invention's processes are stored in the system memory 615, the permanent storage device 625, and/or the read-only 620. For example, the various memory units include instructions for processing appearance alterations of displayable characters in accordance with some embodiments. From these various memory units, the processing unit(s) 610 retrieves instructions to execute and data to process in order to execute the processes of some embodiments.

The bus 605 also connects to the input and output devices 630 and 635. The input devices enable the user to communicate information and select commands to the electronic system. The input devices 630 include alphanumeric keyboards and pointing devices (also called "cursor control devices"). The output devices 635 display images generated by the electronic system 600. The output devices 635 include printers and display devices, such as cathode ray tubes (CRT) or liquid crystal displays (LCD). Some embodiments include devices such as a touchscreen that functions as both input and output devices.

Finally, as shown in FIG. 6, bus 605 also couples electronic system 600 to a network 640 through a network adapter (not shown). In this manner, the computer can be a part of a network of computers (such as a local area network ("LAN"), a wide area network ("WAN"), or an intranet), or a network of networks (such as the Internet). Any or all components of electronic system 600 may be used in conjunction with the invention.

These functions described above can be implemented in digital electronic circuitry, in computer software, firmware or hardware. The techniques can be implemented using one or more computer program products. Programmable processors and computers can be packaged or included in mobile devices. The processes may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For instance, FIGS. 1-4 conceptually illustrate processes in which the specific operations of each process may not be performed in the exact order shown and described. Specific operations may not be performed in one continuous series of operations, and different specific operations may be performed in different embodiments. Furthermore, each process could be implemented using several sub-processes, or as part of a larger macro process. Thus, one of ordinary skill in the art would understand that the invention is not to be limited by the foregoing illustrative details, but rather is to be defined by the appended claims.

We claim:

1. A non-transitory computer readable medium storing a program which, when executed by at least one processing unit of a computing device, facilitates student data privacy compliance and management by schools in relation to online operators, said program comprising sets of instructions for:

collecting, by a privacy compliance server comprising at least one of a school district student information system server and a student data privacy management server, a set of operator data associated with each online operator in a set of online operators;

calculating, by the privacy compliance server, an operator quality score for each online operator in the set of online operators based on the set of operator data associated with the online operator;

assigning, by the privacy compliance server, an operator ranking to each online operator in the set of online operators based on the calculated operator quality score for the online operator;

presenting, by the privacy compliance server, the operator quality score and the assigned operator ranking of each online operator to a user for audit and selection of a particular online operator in a set of online operators;

generating, by the privacy compliance server and in accordance with Child Online Privacy Protection Act (COPPA) rules, a single electronic parental COPPA consent form comprising a set of unsigned student data privacy documents for parents to review and sign;

modifying at least one unsigned student data privacy document from the set of unsigned student data privacy documents based on the calculated operator quality score and the assigned operator ranking of each online operator in the set of online operators;

displaying, on a private webpage hosted by an auto scaling web server that is accessible to a user computing device upon verified user authentication of a parent, the single electronic parental COPPA consent form with the set of modified unsigned student data privacy documents for parent consent approval;

sending, by an email server, a consent approval confirmation email to the parent in response to approved consent, wherein the consent approval confirmation email includes a confirmation link to a signed documents page and a denial link for parental withdrawal of consent;

determining whether the denial link for parental withdrawal of consent is selected;

dynamically updating, by the privacy compliance server, documents to reflect withdrawn consent by the parent when the denial link for parental withdrawal of consent is selected;

generating, by the privacy compliance server, a signed documents page comprising a set of signed student data privacy documents associated with the parent approved consent when the confirmation link to the signed documents page is selected;

tracking, in a student data chain of custody database by a student data chain of custody server, custody and usage of student data associated with each student and available via the privacy compliance server;

recording a plurality of possessor custody and usage events of student data associated with a particular student, said plurality of possessor custody and usage events of student data comprising a consent form generation event that relates to generating the single electronic parental COPPA consent form, a student data privacy document modification event that relates to modifying the at least one unsigned student data privacy document, a private webpage consent form display event that relates to displaying the private webpage with the single electronic parental COPPA consent form on the user computing device, a consent approval confirmation sent email event that relates to sending the consent approval confirmation email to the parent of the particular student, and one of a withdrawn consent document update event that relates to dynamically updating documents to reflect withdrawn consent by the parent's selection of the denial link and a confirmed consent signed documents page generation event that relates to generating the signed documents page when the confirmation link is selected by the parent of the particular student;

dynamically expressing, by the student data chain of custody server, the tracked custody and usage of student data associated with each student in a student data chain of custody report, wherein the tracked custody and usage of student data expressed in the student data chain of custody report of the particular student comprises the consent form generation event, the student data privacy document modification event, the private webpage consent form display event and information about the authenticated and verified parent, the consent approval confirmation sent email event and a particular parent email address associated with the parent of the particular student, one of the withdrawn consent document update event and the confirmed consent signed documents page generation event, and student data possession metrics that express who possessed the particular student data, how each possessor used the particular student data, and time of using the particular student data;

determining a level of COPPA compliance based at least in part on the student data chain of custody report of each student including the particular student; and generating, by the privacy compliance server, a set of student data privacy compliance reports, wherein each student data privacy compliance report documents the level of compliance with the COPPA rules.

2. The non-transitory computer readable medium of claim 1, wherein the program further comprises a set of instructions for collecting, by the privacy compliance server in connection with the email server, a second email address associated with one of another parent of the particular student and a guardian of the particular student, wherein the consent approval confirmation email is sent to the particular parent email address associated with the parent of the particular student and the second email address associated with one of another parent of the particular student and the guardian of the particular student.

3. The non-transitory computer readable medium of claim 2, wherein the program further comprises sets of instructions for:
  collecting a set of administrator data associated with a master admin account;
  collecting a set of parent data associated with the particular student, wherein the set of parent data comprises a first email address associated with the parent of the particular student;
  collecting a set of student data associated with the particular student; and
  receiving the particular parent email address associated with the parent of the particular student as an alternative email input before the email server sends the consent approval confirmation email to the parent in response to approved consent by the parent of the particular student.

4. The non-transitory computer readable medium of claim 1, wherein the user is a teacher.

5. The non-transitory computer readable medium of claim 4, wherein the program further comprises a set of instructions for receiving a selection of an online resource to use in a classroom of the teacher, said online resource comprising at least one of an app, an online service, and a website associated with a particular online operator audited and selected by the teacher.

6. The non-transitory computer readable medium of claim 1, wherein the set of instructions for tracking custody and usage of student data associated with each student comprises sets of instructions for:
  detecting retrieval of student data by an unknown user;
  identifying a particular set of student data of the particular student as the retrieved student data;
  determining whether the unknown user is permitted to retrieve and possess the particular set of student data of the particular student;
  identifying the unknown user as one of (i) a present possessor of the particular set of student data of the particular student when the unknown user is permitted to retrieve and possess the particular set of student data of the particular student and (ii) an unauthorized user of the particular set of student data of the particular student when the unknown user is not permitted to retrieve and possess the particular set of student data of the particular student;
  determining an intended usage by the present possessor of the particular set of student data of the particular student;
  tracking a time duration the particular set of student data of the particular student is in possession of the present possessor;
  adding to the student data chain of custody data one of (i) an unauthorized reference to the particular set of student data of the particular student when the unknown user is identified as the unauthorized user and (ii) an authorized reference to the particular set of student data of the particular student, wherein the authorized reference to the particular set of student data of the particular student comprises an identifier of the present possessor, a textual record for the intended usage, and the tracked time duration the present possessor possessed the particular set of student data of the particular student; and
  storing the student data chain of custody data associated with the particular student in the student data chain of custody database.

* * * * *